United States Patent

Zefira

[11] Patent Number: 5,922,998
[45] Date of Patent: Jul. 13, 1999

[54] BUILT-IN WEIGHING SCALE

[76] Inventor: Uri Zefira, P.O. Box 241, Kfar Tavor 15241, Israel

[21] Appl. No.: 08/860,450
[22] PCT Filed: Dec. 20, 1995
[86] PCT No.: PCT/US95/16592
    § 371 Date: Jun. 26, 1997
    § 102(e) Date: Jun. 26, 1997
[87] PCT Pub. No.: WO96/20391
    PCT Pub. Date: Jul. 4, 1996

[30] Foreign Application Priority Data

Dec. 27, 1994 [IL] Israel ......................................... 112156

[51] Int. Cl.[6] ................................................... G01G 19/08
[52] U.S. Cl. ............................................. 177/136; 177/139
[58] Field of Search ....................................... 177/136, 139, 177/140, 141

[56] References Cited

U.S. PATENT DOCUMENTS 3,059,710 10/1962 Pien ........................................ 177/136

Primary Examiner—Randy W. Gibson
Attorney, Agent, or Firm—Mark M. Friedman

[57] ABSTRACT

A scale on a fork-lift comprising of at least one cantilevered beam tine (18) supported by a rigid member (20) near one end of the cantilevered beam. A weighing platform (16) is positioned above the beam (18) for supporting the load. The platform (16) is supported by at least two load cells (34a, 34b) located between the beam (18) and the platform (16). At least one of the supporting load cells (34a) is located on the beam either at the point of attachment of the rigid member (20), or between the point of attachment and the end (24) of the cantilevered beam opposite the free end (22) of the beam, in order to reduce the bending of the cnatileverrd beam tine and thereby increase the maximum load carrying capacity of the fork-lift.

9 Claims, 5 Drawing Sheets

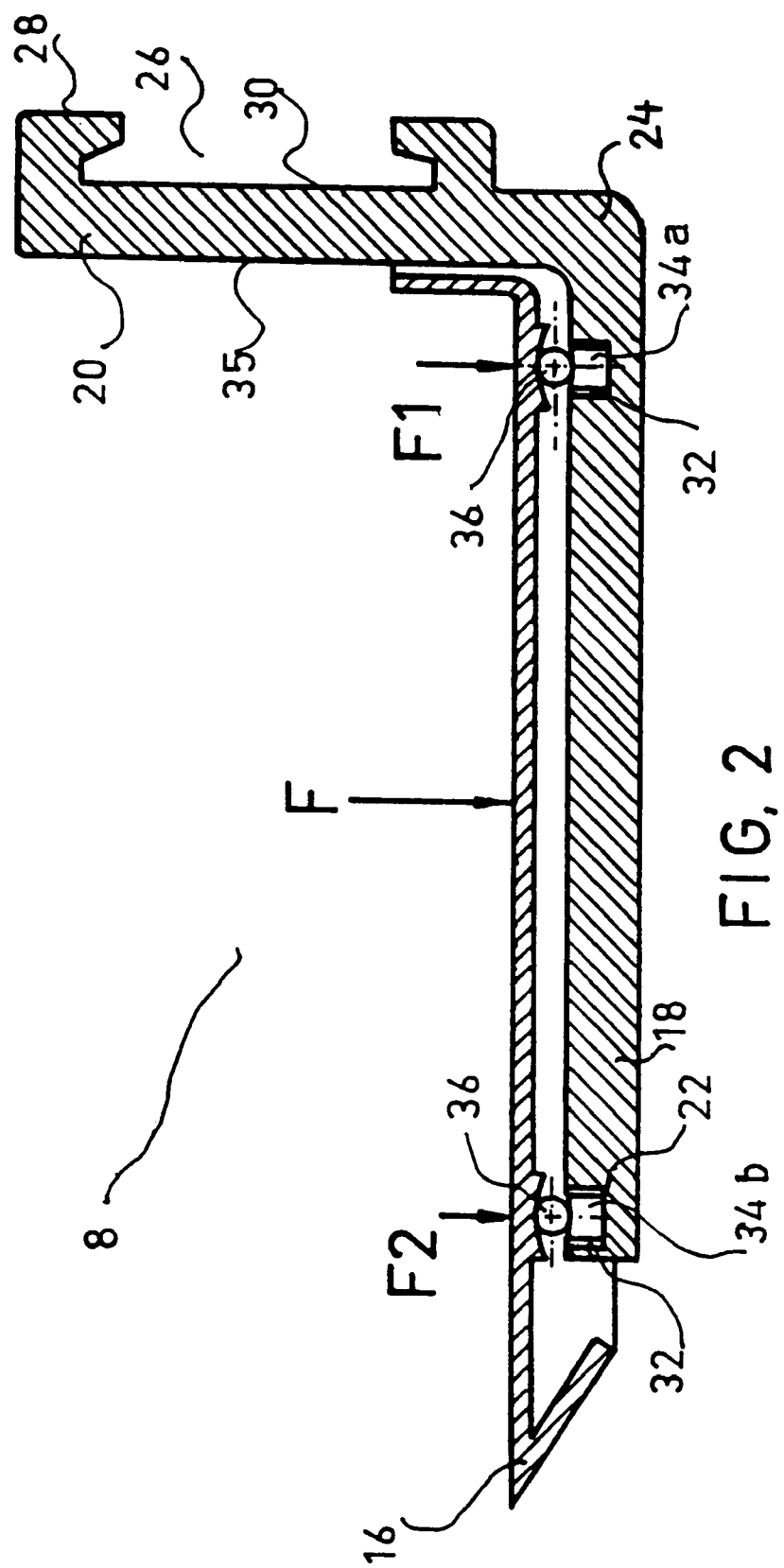

BUILT-IN WEIGHING SCALE

FIELD AND BACKGROUND OF THE INVENTION

The present invention relates to a scale for weighing loads, and especially to a scale built into a fork-lift vehicle.

A large percentage of shipping in the world today is carried out using pallets, which are usually made of wood or metal. The load is placed on the pallet and the pallet is then transferred to a desired mode of transportation using various types of pallet carriers or fork-lift devices usually having one or two tines which are inserted under the pallets. These fork-lift vehicles can be equipped with a built-in scale for weighing the loads on the pallets prior to being transported. Such scales operate using a weighing platform mounted on load cells, which measure the vertical forces applied to them. The load cells are usually placed within recesses formed in the upper surfaces of the tines so that the tines retain a low profile and can be easily inserted under the pallet.

Some types of pallet carriers are equipped with wheels or other types of supports under the forward section of the tines. In other types of pallet carriers however, the tines are supported on or hung from a vertical framework or mast and have no support under their forward sections. As the carriers must lift heavy loads, the tines must be rigidly built in order not to permanently bend or break under the strain of the load. In the event that it is desired to install a weighing scale in the tines, the recesses formed in the tines to hold the load cells will detract from the weight capacity of the tines, since the amount of material in the tine is reduced. Furthermore, the deflection of the tine under the strain of the load can distort the accuracy of the weighing, due to the tilting of the load cells in relation to the vertical direction of the force of the load. There is thus a need for a pallet carrier which is capable of weighing loads, yet whose tines are minimally deflected by the weight of the load.

OBJECT AND BRIEF SUMMARY OF THE INVENTION

It is an object of the present invention to provide a weighing scale for weighing loads on pallet carriers, and particularly in fork-lift vehicles.

It is a further object of the invention to provide a weighing scale whose load cells are placed in recesses in the tines of the pallet carrier so as not to increase the effective height of the tines.

It is a still further object of the invention to provide a weighing scale which does not detract from the load capacity of the pallet carrier, and which minimizes the deflection of the tines under the influence of the load.

It is another object of the invention to provide a pallet carrier containing a weighing scale having the above advantages.

In accordance with this invention there is thus provided a scale for weighing a load comprising: a beam having two ends, one end being unsupported, the beam being fixed to a substantially unbending rigid member so that the beam is not deflected by a force exerted on it at the intersection of the beam with the rigid member, the rigid member being positioned proximate to an opposite end of the beam; a weighing platform positioned above the beam for supporting the load; a plurality of load cells positioned between the beam and the weighing platform for measuring the weight of the load, each of the load cells comprising contact points including a first contact point being in contact with the beam and a second contact point being in contact with the weighing platform; the contact points comprising an anchoring means for fixedly anchoring the load cell and a load bearing element for bearing the load; whereas the first contact point of at least one of the load cells is in contact with the portion of the beam including the intersection, the opposite end and the interval between them.

The scale of the invention overcomes the disadvantages of the prior art scales by positioning a contact point of at least one of the load cells, which is in contact with the tine, at a location of zero moment on the tine, or at a location which creates an opposite moment in the tine. By so positioning a load cell, the total moment on the tine is reduced, thereby decreasing the possibility that the tine will be deflected by the load beyond its elastic range. This increases the load capacity of the tine as well as the accuracy of the weight measurement by the scale.

Further features and advantages of the invention will be apparent from the description below.

BRIEF DESCRIPTION OF THE DRAWINGS

The invention is herein described, by way of example only, with reference to the accompanying drawings, wherein:

FIG. 2 is an enlarged sectional side view of one tine of a fork-lift truck containing a prior art weighing scale;

DESCRIPTION OF PREFERRED EMBODIMENTS

Figure 1:
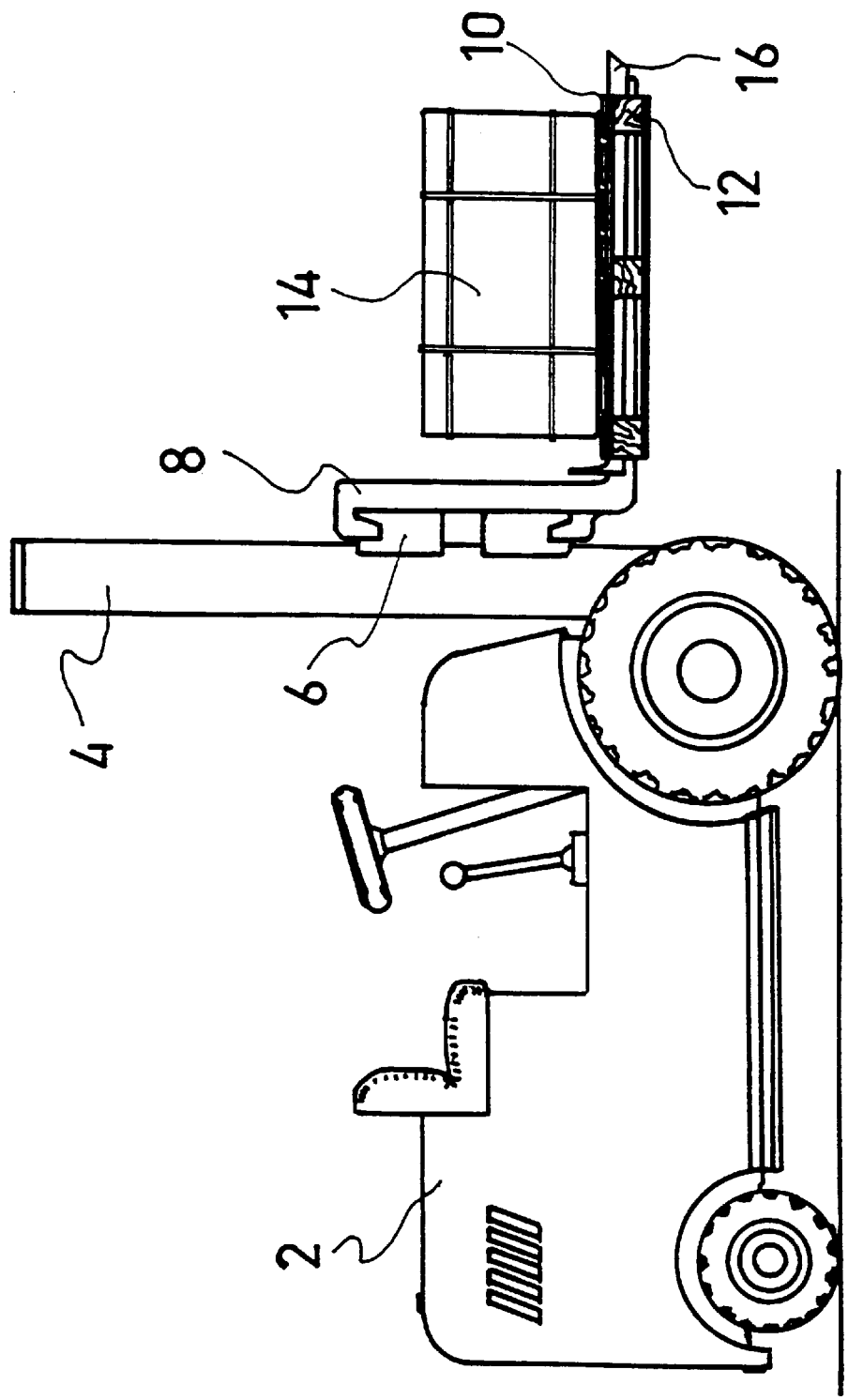
FIG. 1 is a schematic side-view of a fork-lift truck.

Referring now to FIG. 1, there is illustrated a fork-lift truck 2 having a pair of vertical masts 4 (only one of which is shown) which provide guide means for the vertical movement of a crossbeam 6. A pair of L-shaped tines 8 (only one of which is shown) are coupled to the crossbeam, and the distance between them can be adjusted by sliding them along the crossbeam. The tines are inserted under a pallet platform 10, in between parallel rows of rectangular blocks 12, for lifting a load 14 resting on the pallet. The tines are raised and lowered by movement of the crossbeam on the mast. A weighing platform 16 is mounted on the tine and extends beyond its unsupported end.

Figure 3A:
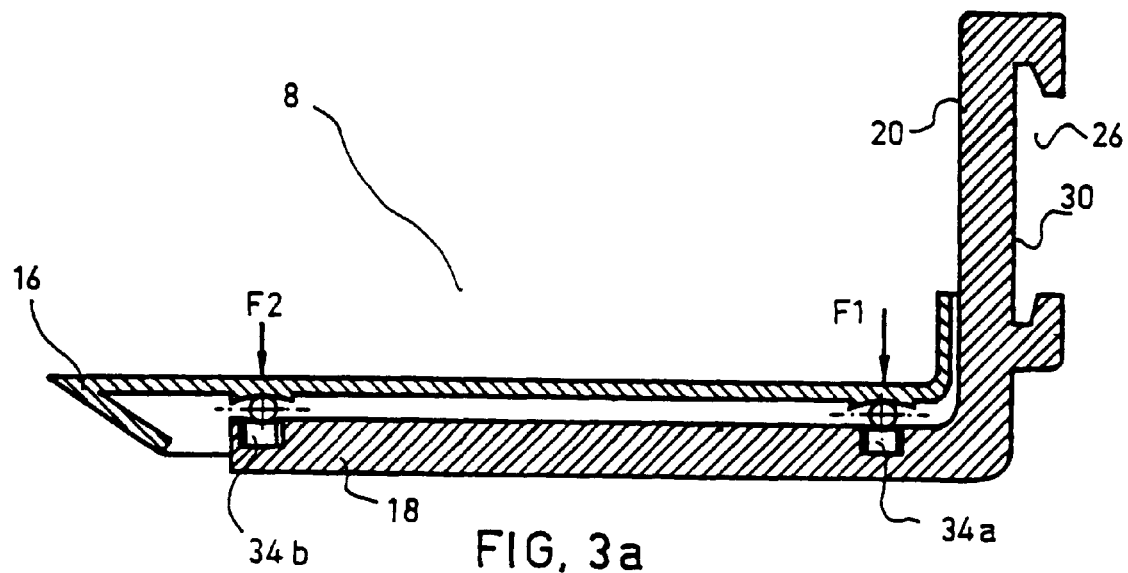
FIG. 3a is a reduced view of FIG. 2.

A prior art tine 8 is illustrated in greater detail in FIGS. 2 and 3a, and comprises an extended console or beam 18 which is integrally formed with a vertical substantially unbending rigid member 20 positioned perpendicularly to the beam. One end 22 of the beam is unsupported, while the opposite end 24 is supported on the crossbeam (6 in FIG. 1) of the fork-lift truck by the rigid member 20. The rigid member is mounted on the crossbeam by insertion of the crossbeam in an indentation 26 in the rear side 28 of the rigid member, so that the inner vertical wall 30 of the indentation abuts the crossbeam.

The upper surface of the beam 18 contains two load cells 34a and 34b located in recesses 32 positioned to the left (in front of) the forward side 35 of the rigid member. One load cell 34b is positioned at the unsupported end 22 of the beam, while the second load cell 34a is positioned proximate to the rigid member. The load cells are anchored to the beam by anchoring means such as screws (not shown), and have load-bearing elements, such as ball bearings 36, protruding above the upper surface of the beam. Although the present invention describes the load-bearing elements as ball bearings, it will be obvious to the skilled man of the art that alternate constructions may be employed. The weighing platform 16 rests on the ball bearings 36 above the beam.

When a load, such as a container on a pallet, is placed on the weighing platform, the force F of the weight of the load is applied to the platform 16. The force F is depicted as being composed of two components, $F_1$ and $F_2$, which are transmitted through the ball bearings 36 to the load cells 34a and 34b, respectively, which measure the force F and translate it into a quantity which represents the weight of the load. This quantity is then transmitted by known electronic means (not shown) to a display where it can be read by the operator. It will be readily apparent to a skilled man of the art that the orientation of the load cells can be reversed, so that they are anchored to the weighing platform while their load bearing elements are in contact with the beam, without affecting the operation of the scale.

Figure 3B:
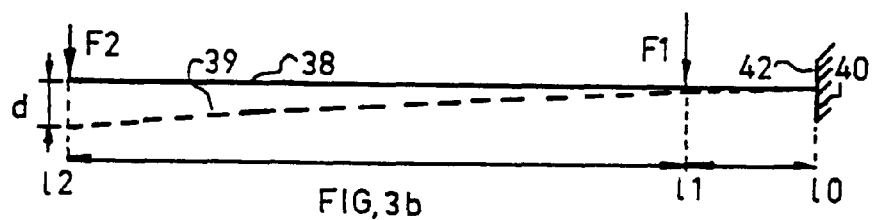
FIGS. 3b, 4b, 5b and 5b' are graphs illustrating the deflection of the tines of FIGS. 3a, 4a and 5a, respectively, as a function of their distances from the rigid member.
Figure 4A:
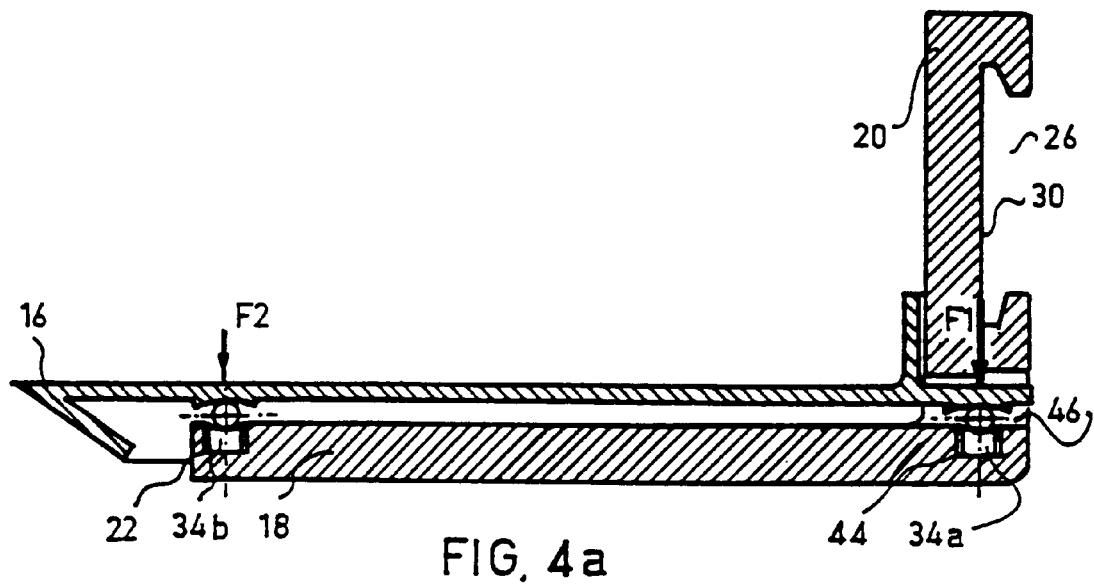
FIGS. 4a and 5a are sectional side views of one tine of a fork-lift truck containing weighing scales according to two respective embodiments of the invention.
Figure 4B:
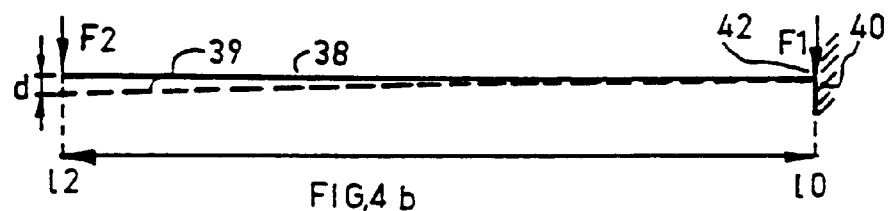
Figure 5A:
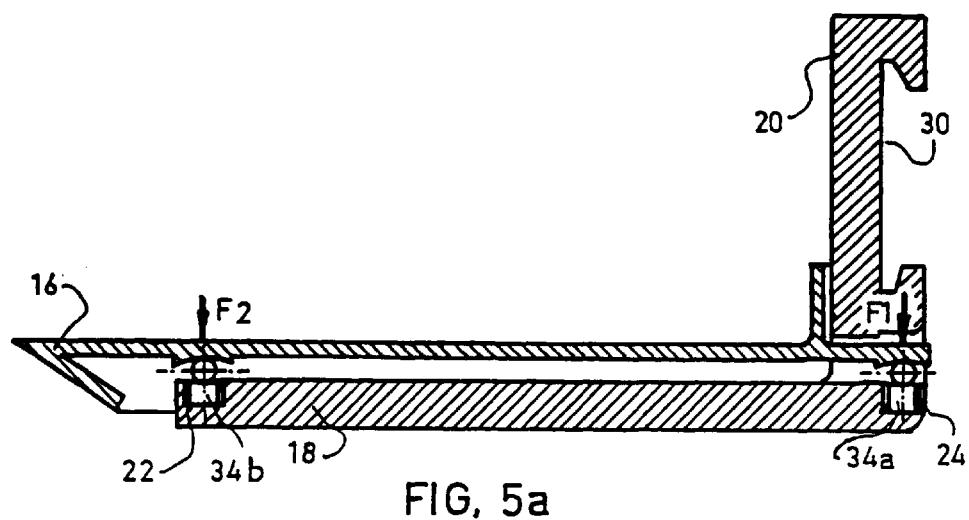
Figure 5B:
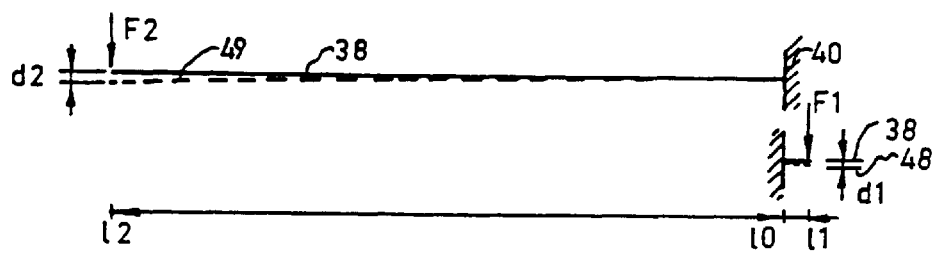
Figure 5B:
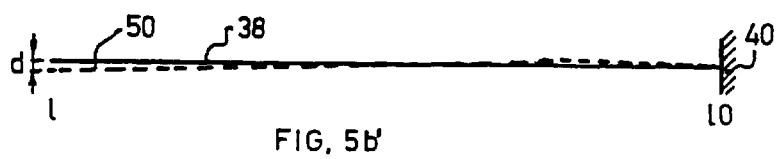

The deflection 'd' of the beam 18 is depicted graphically in FIGS. 3b, 4b, 5b and 5b', in which the beam prior to being deflected by force F is represented by line 38, the beam deflected by force F is represented by the broken line 39, and the rigid member is represented by line 40. The point of support 42 of the beam on the rigid member is positioned at line 40, since this corresponds to the inner vertical wall 30 of the indentation 26, which abuts the crossbeam of the fork-lift truck. This location on the beam is assumed to have zero deflection, due to the proximity of the rigid member to the crossbeam. The distance from line 40 ('$l_0$') to the line of force $F_1$ acting on load cell 34a is represented by "$l_1$", and the distance to $F_2$ is represented by '$l_2$'.

It can be seen from FIG. 3b that the deflection of the beam increases as a function of distance from the rigid support. The deflection $d_2$ due to force $F_2$ at position $l_2$ on the beam can be calculated from formula (a) below, and the deflection $d_1$ due to force $F_1$ at position $l_1$ on the beam can be calculated from formula (b) below:

$$(a)\ d_2 = \frac{F_2 \times l_2^3}{3EI} \quad (b)\ d_1 = \frac{F_1 \times l_1^2}{6EI}(2l_1 + 3[l_2 - l_1])$$

in which E is an elasticity coeficient depending on the material of the beam, and I is an inertia coeficient determined by the dimensions of the beam. The total deflection d of the beam equals $d_1+d_2$.

Figure 3C:
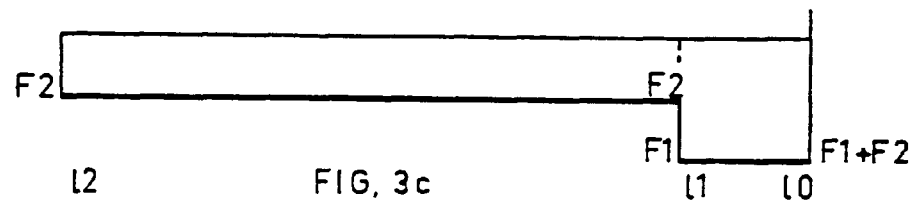
FIGS. 3c, 4c and 5c are graphs illustrating the forces on the tines of FIGS. 3a, 4a and 5a, respectively, at various distances from the rigid member.
Figure 4C:
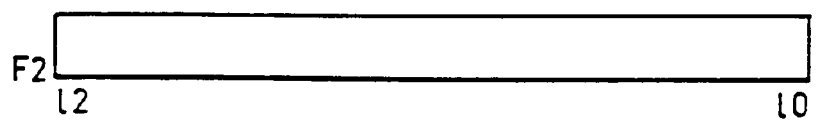
Figure 5C:
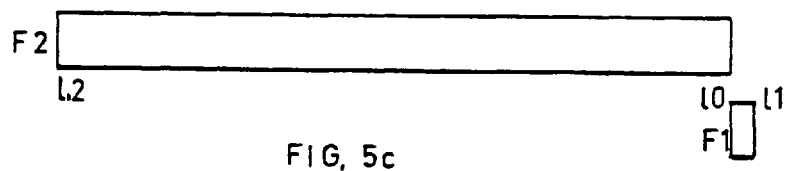

FIGS. 3c, 4c and 5c illustrate the forces acting on the beam at various distances from the rigid support. Referring now to FIG. 3c, between distances $l_2$ and $l_1$ the force is $F_2$, while between $l_1$ and the $l_0$ force $F_1$ is added to $F_2$ to give F. The reaction of the rigid member at $l_0$ to the forces acting on the beam is equal to their sum $F_1+F_2=F$ and opposite in direction, so that there is no deflection at that point.

Figure 3D:
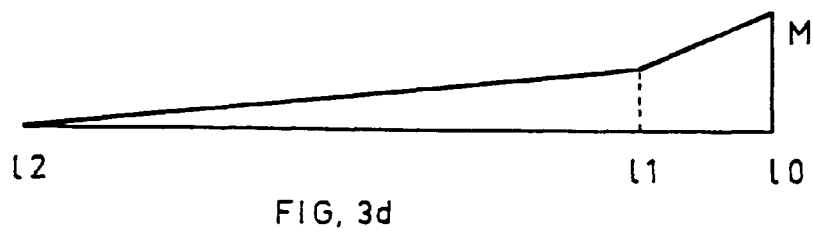
FIGS. 3d, 4d and 5d are graphs illustrating the moment created in the tines of FIGS. 3a, 4a and 5a, respectively, as a function of their distances from the rigid member.
Figure 4D:
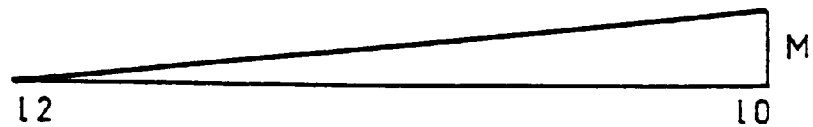
Figure 5D:
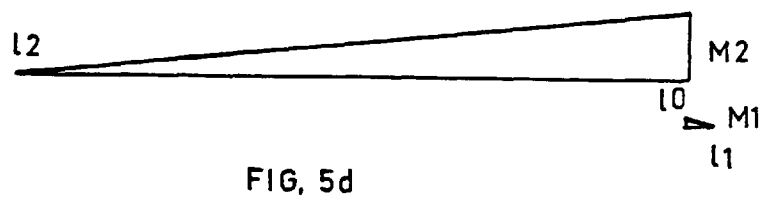

FIGS. 3d, 4d and 5d illustrate the moments created in the beam as a result of the forces acting on it. Referring to FIG. 3d and taking $l_0$ as a reference point, the moment of the force $F_2$ is $M_2=F_2\ l_2$, and the moment of the force $F_1$ is $M_1=F_1\ l_1$. Thus, the total moment M at $l_0$ will be equal to $M_1+M_2$.

One embodiment of the invention is illustrated in FIG. 4a in which one of the load cells 34a is positioned directly under the inner vertical wall 30 of the indentation 26 in the rigid member 20. The other load cell 34b is positioned near the unsupported end 22 of the beam 18. Since, as illustrated graphically in FIG. 4b, the first load cell 34a is aligned with the point of support 42 between the beam and the rigid member at a location on the beam (line 40) where there is no deflection d, the total deflection of the beam results from the force $F_2$ on the load cell 34b alone. Force $F_2$ is the only force which acts on the beam, as illustrated in FIG. 4c, whereas force $F_1$ acts on the rigid support and not on the beam. The moment created in the beam is equal to $F_2\ l_2$, as illustrated in FIG. 4d. This moment is smaller than if the load cell had been positioned to the left of the rigid member, as in FIG. 3a, since in this embodiment of the invention, $F_1$ does not create any moment at the load cell 34a. Thus there is less deflection of the beam, and the load carrying capacity of the beam is enhanced.

It is important to emphasize that the part of the load cell which must be located under the rigid member 20 is the part which transmits the force to the beam. In the embodiment illustrated in FIG. 4a, the anchoring means 44 of the load cell is fixed to the beam 18 while the load bearing element 46 supports the weighing platform 16. In this embodiment, the load bearing element 46 could be positioned to the left of the rigid member as long as the anchoring means 44 is positioned under the rigid member. In the event that the load cell was oriented so that the anchoring means was fixed to the weighing platform and the load bearing element was in contact with the beam, the load bearing element would have to be positioned under the rigid member.

FIG. 5a illustrates a second embodiment of the invention, in which one of the load cells 34a is positioned laterally of the rigid member 20 near the opposite end 24 of the beam 18. In this embodiment, the force F of the load is composed of two components, $F_1$ acting on the load cell 34a and $F_2$ acting on the load cell 34b, which is positioned adjacent the unsupported end 22 of the beam. As illustrated in FIG. 5b, each of these component forces acting alone would cause oppositely-directed deflections in the beam 38. Specifically, $F_1$ would cause a clockwise deflection $d_1$ to position 48 of the beam, to the right of the rigid support (line 40), and $F_2$ would cause a counter-clockwise deflection $d_2$ to position 49 of the beam, to the left of the rigid support (line 40). The actual resultant deflection d of the beam is illustrated by the broken line 50 in FIG. 5b', and is the sum of the two deflections $d_1$ and $d_2$.

Forces $F_2$ and $F_1$ act on the respective sides of the beam as illustrated in FIG. 5c, and cause a reactive force in the rigid member of $-F=F_1+F_2$. The moment created in the beam is equal to the sum of the individual moments resulting from the forces acting on it. As illustrated in FIG. 5d, the moment of the force $F_2$ at $l_0$ is $M_2=F_2\ l_2$, and the moment of the force $F_1$ at $l_0$ is $M_1=F_1\ l_1$. It is clear from the drawing that $M_1<M_2$ since the force arm $l_1$ is shorter than the force arm $l_2$. Furthermore, since the forces are acting on either side of the rigid member, the moments created in the beam by them act in opposite directions. Thus, the resultant moment M on the rigid member is equal to $M_2-M_1$, and the deflection of the beam is reduced even more than in the first embodiment where $M_1=0$.

It will be easily understood from the above that the greater the distance of load cell 34a from the rigid member towards the opposite end 24 of the beam, the greater the moment $M_1$ ($M_1 = F_1 \times l_1$), and the smaller the resultant deflection of the entire beam, thus contributing to the load capcity of the tine.

While the present invention has been described in terms of several preferred embodiments, it is expected that various modifications and improvements will occur to those skilled in the art upon consideration of this disclosure.

The scope of the invention is not to be construed as limited by the illustrative embodiments set forth herein, but is to be determined in accordance with the appended claims.

What is claimed is:

1. A scale for weighing a load comprising:

a beam having two ends, one end being unsupported, said beam being fixed to a substantially unbending rigid member so that said beam is not deflected by a force exerted on it at the intersection of said beam with said rigid member, said rigid member being positioned proximate to an opposite end of said beam;

a weighing platform positioned above said beam for supporting said load;

a plurality of load cells positioned between said beam and said weighing platform for measuring the weight of said load, each of said load cells comprising contact points including a first contact point being in contact with said beam and a second contact point being in contact with said weighing platform;

said contact points comprising an anchoring means for fixedly anchoring said load cell and a load bearing element for bearing said load;

whereas said first contact point of at least one of said load cells is in contact with the portion of said beam including said intersection, said opposite end and the interval between them.

2. A scale according to claim 1 wherein said first contact point of at least one of said load cells is aligned with said intersection so that a force exerted on said first contact point does not create a moment in said beam.

3. A scale according to claim 1 wherein said first contact point of at least one of said load cells is positioned laterally of said intersection towards said opposite end of said beam so that a force exerted on said first contact point creates a moment in said beam opposite in direction to a moment created in said beam by a force exerted on said load cells positioned between said intersection and said unsupported end.

4. A scale according to claim 1 wherein said first contact point comprises said anchoring means and said second contact point comprises said load bearing element.

5. A scale according to claim 1 wherein said second contact point comprises said anchoring means and said first contact point comprises said load bearing element.

6. A scale according to claim 1 wherein said load cells are located in recesses in the upper surface of said beam.

7. A scale according to claim 1 wherein said rigid member is a vertical column positioned perpendicularly to said beam.

8. A scale according to claim 1 wherein said beam is a tine of a fork-lift vehicle, and said rigid member is mounted on a cross-beam of said vehicle.

9. A fork-lift vehicle including a tine, said tine comprising a scale according to claim 1.

* * * * *